Sept. 24, 1929.  W. E. KEMMERICH  1,729,043
PROCESS FOR THE GRADUAL PRODUCTION OF GASES
Filed Sept. 8, 1924

INVENTOR
William E. Kemmerich
BY
ATTORNEY

Patented Sept. 24, 1929

1,729,043

UNITED STATES PATENT OFFICE

WILLIAM E. KEMMERICH, OF MONTCLAIR, NEW JERSEY

PROCESS FOR THE GRADUAL PRODUCTION OF GASES

Application filed September 8, 1924. Serial No. 736,506.

My invention relates to the production of gases and refers particularly to the production of predetermined quantities of chlorine gas.

The value of chlorine as a therapeutic agent in certain respiratory diseases is well known and later experiments have indicated the necessary quantities of chlorine and the best conditions required for the most efficient application of this gas in the treatment of designated respiratory diseases.

Thorough investigations regarding the effective atmospheric chlorine content conducted by many authorities upon the subject and especially those under the direction of the Medical Corps of the United States Army have shown that inhalations of chlorine of a concentration of 0.015 to 0.021 mg. per liter for one or more hours have a distinctly curative value in common colds, influenza, whooping cough, coryza, acute laryngitis and pharyngitis, bronchitis, rhinitis and other respiratory diseases in which the infected organisms are located on the surface of the mucous membranes of the respiratory passages.

It has been further shown that a less concentration than that indicated above is insufficient to produce the desired results while a greater concentration is undesirable because of its liability to attack the mucous membrane itself, causing an irritation of the healthy tissues.

It is evident, therefore, that the atmospheric content of chlorine is of the greatest importance both in producing effective results and in preventing undesirable irritations.

This remedial agent for mucous membranous diseases is of the highest value and, as its application is of short duration, occupying only a few hours, its employment as a household remedy for these common diseases suggests itself as meeting universal demand.

As the effectiveness of the remedy is dependent upon the atmospheric chlorine content within comparatively small limitations, it is essential that any method for its domestic application must be of such a character as to allow of its effective use by those not conversant with chemical reactions and who are not possessed of the expensive and elaborate apparatus necessary for the analysis of gases and the control of their production.

It is evident, therefore, that if this valuable remedy for so many common ailments is to be accessible to the public and capable of application with ease and certainty, it must be presented in such a form as to be practically automatic in the production of definitely determined quantities of chlorine gas.

Further, the production of the desired quantity of chlorine must be gradual and comparatively uniform, in order that it may be thoroughly diffused through the enclosed space to prevent the injurious and unequal concentrations of chlorine within the atmosphere.

It is further evident that the chemicals necessary for the production of the chlorine must be of such character as not to deteriorate upon storage incident to ordinary commercial employment, as otherwise, the amount of chlorine evolved will vary.

Another essential feature of the process for general use is the ease of chlorine production, free from cumbersome expensive devices and complicated and involved processes of procedure.

Another necessary element is the production of pure chlorine free from injurous gases or other chemical products.

It is evident, therefore, that a successful and effective process for the production of chlorine as a remedial agent must be simple in application, positive in the amount of chlorine evolved, stable in the character of chemicals employed, gradual in the production of chlorine and must result in the production of pure chlorine.

The process of my invention, possess all of the above and other desirable and necessary features and present a means whereby the valuable remedial results of chlorine may be effectively produced by the individual.

In a general way, my process includes a plurality of materials which are comparatively stable in their unmixed conditions but which, when brought into contact with each other in the presence of a liquid, produce chlorine gas and my device is of such a character that the production of chlorine gas from the indicated materials is automatically gradual.

It is well known that many substances when brought into contact with each other will produce chlorine gas, such gas production being generally rapid and in many cases of such a character as to be almost explosive in their reaction.

I have found means, however, by which this ordinary rapid evolution of chlorine may be automatically controlled so that the gas production is slow and comparatively uniform.

My process includes the further essential feature that a predetermined amount of chlorine gas may be produced without danger of the evolution of further quantities which might be injurious to the patient.

In my process, I bring into gradual contact with each other a plurality of materials in the presence of a liquid resulting in the formation of chlorine, the gradual intermixture of the chlorine-producing materials being automatically controlled by the reaction incident to the evolution of the gas itself. As but comparatively small quantities of the materials are in contact at any particular time the production of chlorine is gradual and the intermixture of the materials being dependent upon the production of chlorine, the intermixture is gradual, resulting in a further gradual evolution of chlorine.

This process of mine is effectively applied in my device which is adapted for this described gradual intermixture of the chlorine-producing materials.

In the accompanying drawings illustrating modifications of the device of my invention, similar parts are designated by similar numerals.

Figure 3 is a side view of one form of a tube container.

Figure 4:
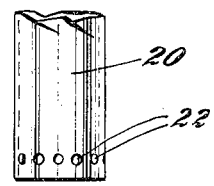
Figure 4 is a side view of a modified form of a tube container.

The particular form of my device capable of adaptation to my process, shown in the accompanying drawings, comprises a liquid-holding receptacle 10 having a neck 11. Placeable within the neck 11 is a rubber stopper, or closure, having a plurality of smaller openings 13, 13, 13, 13 and a larger opening 14, the interior annular portion 15 of the stopper extending slightly beyond the annular portion 16. An annular trough, or receptacle, 17 is formed around the annular portion 16 by means of the annular bottom 18 and annular side 19. A removable graduated glass tube 20 is capable of placement within the opening 14. The tube 20 has a plurality of cut-outs 21, 21, as shown in Figure 3, or a plurality of openings 22, 22, as shown in Figure 4, at its open end, the other end of the tube being closed.

An annular disc 23 has a centrally positioned opening through which the tube 20 may pass, the disc 23 being of slightly less diameter than the space between the trough wall 19.

The following is an example of the carrying out of my process in my device shown in the accompanying drawings:—

The commercial outfit may consist of the receptacle 10 containing a material 24 which comprises hydrochloric acid absorbed by infusorial earth, I, having found that 5 parts by weight of infusorial earth will absorb about 10 parts by weight of concentrated hydrochloric acid, forming a mixture which, while not entirely dry, is sufficiently dry for purposes of commercial use in my process. This receptacle is closed by means of a rubber cork. An additional element of the commercial outfit is the operating rubber closure shown in the drawings and the third element is the tube 20 containing a mixture 25 of potassium permanganate and sand, so proportioned that the contents of the tube between each graduation is sufficient to produce the indicated amount of chlorine for one thousand cubic feet of air. This tube is also closed by means of a rubber stopper. The mixture 24 may be enclosed in a separate container, if desired.

The operation is as follows:—

Figure 1:
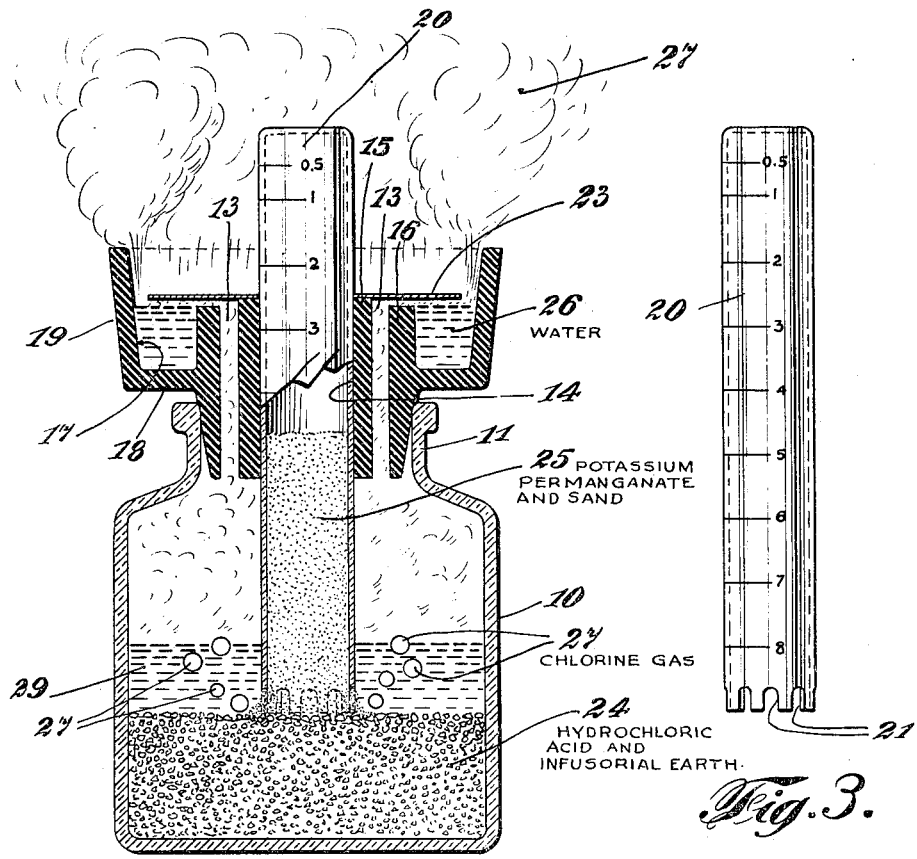
Figure 1 is a vertical cross-section of one form of my device taken through the line 1—1 of Figure 2.
Figure 2:
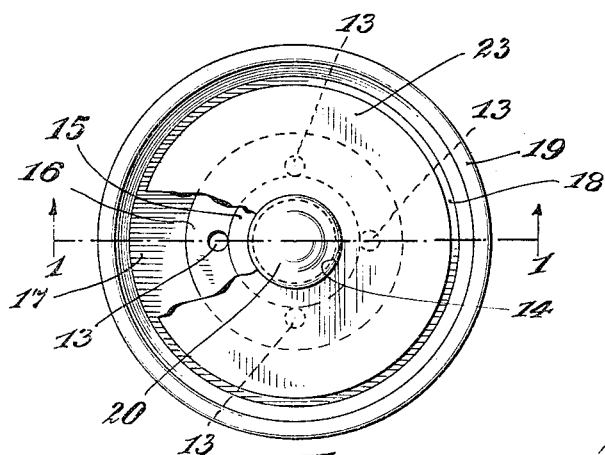
Figure 2 is a top plan view of the device of Figure 1, partly broken away for clearness of description.

The closure cork is removed from the receptacle 10 and the operating rubber closure inserted. The contents of the room in which the treatment is to be given is estimated in cubic feet and sufficient mixture 25 is left within the tube 20 for the estimated room capacity as indicated by the tube graduations. The receptacle 10 is then tilted at an angle and the inverted open tube 20 passed through the opening 14, care being taken that the mixture 25 does not fall from the tube, the latter being moved inwardly until it rests upon the exposed surface of the mixture 24. The receptacle is then righted and the position of the mixtures 24 and 25 is as shown in Figure 1. Water is now poured into the trough 17 and allowed to overflow into the receptacle 10 through the openings 13, 13, 13, 13. When sufficient water has been added to the receptacle, the audition is interrupted and the disc 23 placed in position as shown.

A portion of the water now containing hydrochloric acid passing through the openings 21, 21 causes the production of chlorine gas along the contact surfaces of the mixtures 24 and 25, the bubbles of gas passing upwardly through the hydrochloric acid 29, through the openings 13, 13, 13, 13, under the disc 23 over the water surface 26, which absorbs any hydrochloric acid which may have been carried by the chlorine gas, and thence outwardly into the atmosphere of the room around the entire periphery of the wall 19.

As but a small portion of the mixtures 24 and 25 are in contact with each other, the production of chlorine will be gradual and in small quantity.

As the chlorine producing ability of the two mixtures becomes exhausted, the mixture 25 will move downwardly, the heavy sand aiding the movement, presenting a new surface for contact with the mixture 24, thus continuing the gradual and practically uniform evolution of chlorine until the mixture 25 is exhausted.

It is evident that my process is not limited to the particular chemicals mentioned above, but is applicable to any chemicals of a solid, or semi-solid, nature which, when brought together in the presence of a liquid, will produce chlorine.

Among the substances suitable for employment in my process in conjunction with hydrochloric acid, or hydrochloric acid producing chemicals, are manganese, dioxides, permanganates, chloride of lime, chlorates, perchlorates, perborates, percarbonates, persulphates, peroxides, &c.

Among the hydrochloric acid producing substances adapted to my process are hydrochloric acid gas absorbed by an inert substance, hydrochloric acid absorbed by an inert substance, aluminium chloride, phosphorous pentachloride, boric chloride, a mixture of sodium chloride and sodium bisulphate, and phosphorous oxychloride, sulphuryl chloride and similar chemicals absorbed in an inert substance.

Further, substances such as chloride of lime and others eliminating chlorine when brought into contact with acids may be employed with acids other than hydrochloric acid.

It is evident that the products 24 and 25 may be in tablet form, or may be contained in capsules, each producing a definite quantity of chlorine, or may be otherwise conveniently arranged.

It will thus be seen that my process presents effective means for the gradual production and diffusion of chlorine, the continual contact of new chlorine-producing substances being effected by the results of the production of the chlorine.

I do not limit myself to the particular size, shape, number, material, or arrangement of parts, nor to the particular chemicals illustrated and described, as these are given simply as a means for clearly describing my invention.

What I claim is:—

1. A process of producing chlorine which comprises bringing together in the presence of an acid a plurality of substances which will produce chlorine in the presence of the acid in such a manner that the production of the chlorine will cause a gradual gravitational contact of the substance.

2. A process of producing chlorine which comprises bringing together in the presence of an acid a plurality of substances which will produce chlorine in such a manner that the produced chlorine will force unattacked portions of the substances into contact with each other, resulting in the gradual production of chlorine.

3. A process of producing chlorine which comprises supporting a column of a substance upon a mass of another substance which will produce chlorine when brought into contact with each other in the presence of a liquid, introducing the liquid to the contact portions of the substances, whereby the column of substance will descend upon the substance mass as the contact portions of the substances produce chlorine.

4. A process of producing chlorine which comprises bringing together a substance which will produce chlorine in the presence of an oxidizing substance and an oxidizing substance in such a manner that the production of chlorine will cause a gravitational contact between unattacked portions of the substances.

5. A process of producing chlorine which comprises causing an abutment between comparatively small surfaces of a plurality of substances which interact to form chlorine in such a manner that the interaction between the substances will gravitatively cause the abutment of new comparatively small surfaces of the substances.

6. A process of producing chlorine which comprises causing a comparatively small surface contact between hydrochloric acid and a substance which will produce chlorine by contact reaction in such a manner that the production of the chlorine will cause the gradual gravitational contact of unattacked surfaces of the substances.

7. A process of producing chlorine which comprises bringing a small portion of a potassium permanganate mass into contact with hydrochloric acid in such a manner that the production of chlorine will allow of the gradual gravitational contact of unattacked portions of the potassium permanganate with hydrochloric acid.

8. A process of producing chlorine which comprises bringing a small portion of a potassium permanganate mass into contact with hydrochloric acid absorbed in inert substances and adding water, the substances being so positioned with respect to each other that the greater portion of the potassium permanganate mass will be protected from liquid contact, the production of the chlorine causing the gradual gravitational contact of potassium permanganate and hydrochloric acid.

Signed at New York city, in the county of New York and State of New York, this 3rd day of September, 1924.

WILLIAM E. KEMMERICH.